United States Patent [19]
Czachor

[11] Patent Number: 5,316,437
[45] Date of Patent: May 31, 1994

[54] GAS TURBINE ENGINE STRUCTURAL FRAME ASSEMBLY HAVING A THERMALLY ACTUATED VALVE FOR MODULATING A FLOW OF HOT GASES THROUGH THE FRAME HUB

[75] Inventor: Robert P. Czachor, Cincinnati, Ohio

[73] Assignee: General Electric Company, Cincinnati, Ohio

[21] Appl. No.: 19,727

[22] Filed: Feb. 19, 1993

[51] Int. Cl.⁵ ............................................. F01B 25/00
[52] U.S. Cl. ..................... 415/115; 415/47; 415/144; 137/468; 236/101 R
[58] Field of Search ................. 415/115, 47, 134, 136, 415/144; 137/468; 236/101 R

[56] References Cited

U.S. PATENT DOCUMENTS

| | | | |
|---|---|---|---|
| 3,632,221 | 1/1972 | Uehling | 415/115 |
| 3,734,639 | 5/1973 | Short | 60/39.75 |
| 3,736,069 | 5/1973 | Beam, Jr. et al. | 137/468 |
| 3,966,354 | 6/1976 | Patterson | 415/139 |
| 3,972,181 | 8/1976 | Swayne | 415/115 |
| 4,023,731 | 5/1977 | Patterson | 236/93 |
| 4,023,919 | 5/1977 | Patterson | 415/116 |
| 4,050,843 | 9/1977 | Needham et al. | 415/136 |
| 4,217,755 | 8/1980 | Williams | 415/115 |
| 4,271,666 | 6/1981 | Hurley et al. | 415/115 |
| 4,397,471 | 8/1983 | Feldman et al. | 415/115 |
| 4,805,398 | 2/1989 | Jourdain et al. | 415/47 |
| 4,812,106 | 3/1989 | Purgavie | 415/139 |
| 4,883,407 | 11/1989 | Touze | 415/142 |
| 4,900,220 | 2/1990 | Guimier et al. | 415/47 |
| 4,989,406 | 2/1991 | Vdoviak et al. | 415/142 |
| 5,064,343 | 11/1991 | Mills | 415/115 |
| 5,092,737 | 3/1992 | Lau | 415/173.2 |
| 5,098,257 | 3/1992 | Hultgren et al. | 415/115 |
| 5,188,145 | 2/1993 | Mathieu | 137/468 |

Primary Examiner—Edward K. Look
Assistant Examiner—Mark Sgantzos
Attorney, Agent, or Firm—Jerome C. Squillaro; Nathan D. Herkamp

[57] ABSTRACT

A structural frame assembly for use in a gas turbine engine includes an annular inner hub, an annular outer casing and a plurality of circumferentially-spaced and radially extending hollow struts connected to the inner hub and outer casing. Hot gases are extracted from the engine primary flowpath, using a scoop attached to each strut, and are directed through the struts to the inner hub interior for the purpose of reducing a bulk temperature differential between the outer casing and the inner hub and for providing a uniform temperature distribution within the inner hub. A first portion of the hot gases entering the inner hub flows continuously through passages extending through the inner hub forward wall and scrubs an exterior of the forward wall, using an annular shield attached to the inner hub, before re-entering the engine flowpath. A second portion of the hot gases entering the inner hub exits through passages extending through the inner hub aft wall and is modulated using a thermally actuated valve mounted to the aft wall to match the thermal requirements of the inner hub with the flow of hot gases and to minimize the performance penalty associated with the extraction of the gases. Hot gases exiting the valve scrub an exterior surface of the aft wall, accomplished in part by an annular spring clip attached to the inner hub and resiliently engaging the valve, before discharging to a chamber vented to ambient conditions.

9 Claims, 4 Drawing Sheets

GAS TURBINE ENGINE STRUCTURAL FRAME ASSEMBLY HAVING A THERMALLY ACTUATED VALVE FOR MODULATING A FLOW OF HOT GASES THROUGH THE FRAME HUB

FIELD OF THE INVENTION

The present invention relates to gas turbine engines and, more particularly, to a structural frame assembly of gas turbine engines, with the assembly including a thermally actuated valve for modulating a flow of hot gases through the frame hub.

RELATED ART

Conventional high bypass ratio turbofan engines, which are included in the more general category of gas turbine engines and which may be used for aircraft propulsion, typically include a fan, booster, high pressure compressor, combustor, high pressure turbine and low pressure turbine in serial axial flow relationship about a longitudinal centerline axis of the engine. The high pressure turbine is drivingly connected to the high pressure compressor via a first rotor shaft, with the rotatable portions of the combination of components comprising the high pressure rotor module. The low pressure turbine is drivingly connected to both the fan and booster via a second rotor shaft, with the rotatable portions of the combination comprising the low pressure rotor module. The high and low pressure rotor modules are supported by bearings which, in turn, are supported by structural frame components such as the turbine rear frame assembly which is positioned immediately downstream of the low pressure turbine.

Due to its position downstream of the low pressure turbine, the turbine rear frame assembly is exposed to the hot combustion gases of the primary or core gas stream which are produced when the pressurized air exiting the high pressure compressor enters the combustor and is mixed with fuel and burned to provide a high energy gas stream. The high energy gas stream then expands through both the high and low pressure turbines prior to engaging the turbine rear frame assembly. The turbine rear frame assembly typically includes an annular hollow inner hub box, an annular outer casing and a plurality of circumferentially spaced and radially extending hollow struts which extend between and are fixedly connected to the inner hub and outer casing. The inner hub is relatively large and massive, in comparison to the outer casing, in order to satisfy engine dynamic stiffness requirements necessary to maintain rotor to stator concentricity and the associated clearances within acceptable limits. Due to the relatively high thermal mass of the inner hub and the relatively low thermal mass of the outer casing, the thermal response of the inner hub is much slower than that of the outer casing during engine transient conditions such as a start or an acceleration from idle to a maximum power condition. The resulting thermal mismatch coupled with the restraints imposed by the radially extending struts which interconnect the inner hub and outer casing can create destructive thermal stresses. For instance, during the aforementioned transient operating conditions comprising engine accelerations, the outer casing is placed in a state of hoop compression which has been known to buckle the outer casing wall on a number of turbine rear frame assemblies.

One system which has been employed to relieve the aforementioned outer casing buckling distress is that which is utilized in the CF6-80 family of engines manufactured by the General Electric Company, the assignee of the present invention, wherein a plurality of scoops are employed to divert hot gases from the primary gas stream through the interior of the hollow struts and into the interior space of the hub box of the turbine rear frame assembly. The hot gases then exit the hub box through a plurality of holes formed in the forward wall of the hub and are forced to scrub the forward surface of the radially extending forward wall, by a shield attached at an inner end to the hub, before discharging back into the gas stream. The hot gases re-enter the gas stream at the same engine station where they were originally extracted, which is adjacent the leading edges of the struts, in order to minimize the performance penalty associated with the extracted gases. While this system tends to reduce the thermal mismatch between the inner hub and outer casing, it includes several disadvantages which were not addressed prior to the present invention. One disadvantage of the previously described system is that the available flow rate of the hot gases which are extracted is limited by the pressure recovery obtained by the scoops and the relatively small differential pressure driving the flow of gases which is equal to the difference between the total and static pressures of the primary gas stream at the leading edges of the struts. A second disadvantage is due to the absence of exit holes in the aft wall of the hub box which causes the air entering the hub to be driven forward to the exit holes in the forward wall of the hub. Consequently, the system fails to provide a uniform temperature distribution in the hub structure. A third disadvantage is that while the system forces the hot gases exiting the hub to scrub the forward wall of the hub, it fails to accomplish this for the aft wall. The absence of this feature also adversely affects the uniformity of the temperature distribution of the hub and therefore the thermal response of the hub.

In view of the foregoing, prior to this invention a need existed for an improved structural frame assembly of a gas turbine engine providing an increased flow of hot gases to the frame assembly hub and a more uniform temperature distribution within the hub in order to further reduce the thermal mismatch between the inner hub and outer casing during engine transient conditions and consequently to improve the buckling margin and cyclic life of the outer casing.

SUMMARY OF THE INVENTION

Accordingly, the present invention is directed to a structural frame assembly of a gas turbine engine which is responsive to the aforementioned needs and which therefore includes the following objects:

To provide a structural frame assembly with improved casing buckling margin and cyclic life;

To provide a structural frame assembly with a reduced bulk temperature differential between the inner hub and the outer casing and a uniform temperature distribution of the inner hub;

To provide a structural frame assembly with an increased flow of hot gases to the inner hub during portions of the engine operating conditions and a valve means for modulating a portion of the flow of hot gases through a plurality of holes extending through an aft wall of the hub thereby minimizing the performance penalty associated with the increased flow of hot gases by matching the flow rate to the frame hub with the thermal requirements of the frame hub throughout the engine operating conditions.

According to a preferred embodiment of the present invention, the structural frame assembly comprises: an annular inner hub made of a material having a relatively high coefficient of thermal expansion; an annular outer casing concentric with the inner hub about a longitudinal axis of the engine; a plurality of radially extending hollow struts extending between and fixedly connected to the inner hub and outer casing; and means for reducing a bulk temperature differential between the inner hub and the outer casing and for providing a uniform temperature distribution of the inner hub; wherein the means for reducing and providing comprises scoop means for directing a flow of hot gases from a flowpath of the engine through an interior of each of the struts into an interior of the inner hub and valve means for modulating a portion of the flow of hot gases entering the inner hub through a flow discharge means formed in an aft wall of the inner hub.

Another preferred embodiment according to the present invention includes the following additional structural features and function. The valve means comprises an annular valve member having a C-shaped cross-section and made of a material having a relatively low thermal coefficient of expansion, wherein the valve means is thermally actuated, and wherein the valve member includes a pair of axially extending legs and a radially extending leg integrally attached to each of the axially extending legs. The aft wall of the inner hub includes a pair of axially extending and radially spaced lips wherein the pair of lips engages the pair of axially extending legs when the valve means is in a closed position and form first and second annular valve passages with the pair of legs when the valve means is in an open position. The flow discharge means comprises a plurality of holes extending through the aft wall of the inner hub, with each hole being in flow communication with the interior of the inner hub and with the first and second annular valve passages when the valve means is in the open position. A first one of the pair of lips includes an intermediate flow passage means for providing flow communication between the plurality of holes in the aft wall of the inner hub and the first valve passage when the valve means is in an open position. The means for reducing and providing further comprises an annular spring clip having an inner end fixedly attached to the aft wall of the inner hub and an outer end resiliently engaging an aft surface of the radially extending leg of the valve member, wherein the spring clip urges a forward surface of the radially extending leg against the first one of the pair of lips of the aft wall of the inner hub. The spring clip forms an annular plenum with the valve member and the aft wall of the inner hub, wherein the spring clip causes the flow of hot gases discharging from the second annular valve passage into the annular plenum to scrub an aft surface of the aft wall of the inner hub before exiting the annular plenum through a channel means integrally formed with the inner end of the spring clip. The flow of hot gases exiting the first annular valve passage and that which exits the channel means discharges to a chamber which is vented to ambient conditions. The means for reducing and providing also further comprises: an annular shield having an inner end fixedly attached to the inner hub and an outer end axially spaced from a forward wall of the inner hub such that the shield and the forward wall form a second annular plenum therebetween; passage means extending through the forward wall, wherein the passage means is in continuous flow communication with the interior of the inner hub and with the second annular plenum during operation of the engine; wherein the annular shield causes the flow of hot gases entering the second annular plenum to scrub a forward surface of the forward wall of the inner hub before discharging into the flowpath of the engine at a location immediately upstream of the hollow struts. The scoop means comprises a plurality of scoops with each scoop being directly attached to one of the hollow struts and having an inlet facing the flowpath of the engine.

BRIEF DESCRIPTION OF THE DRAWINGS

The foregoing and other objects, features and advantages of the present invention will become more apparent from the following detailed description of the preferred embodiments when taken in conjunction with the accompanying drawings in which.

DETAILED DESCRIPTION

Figure 1:
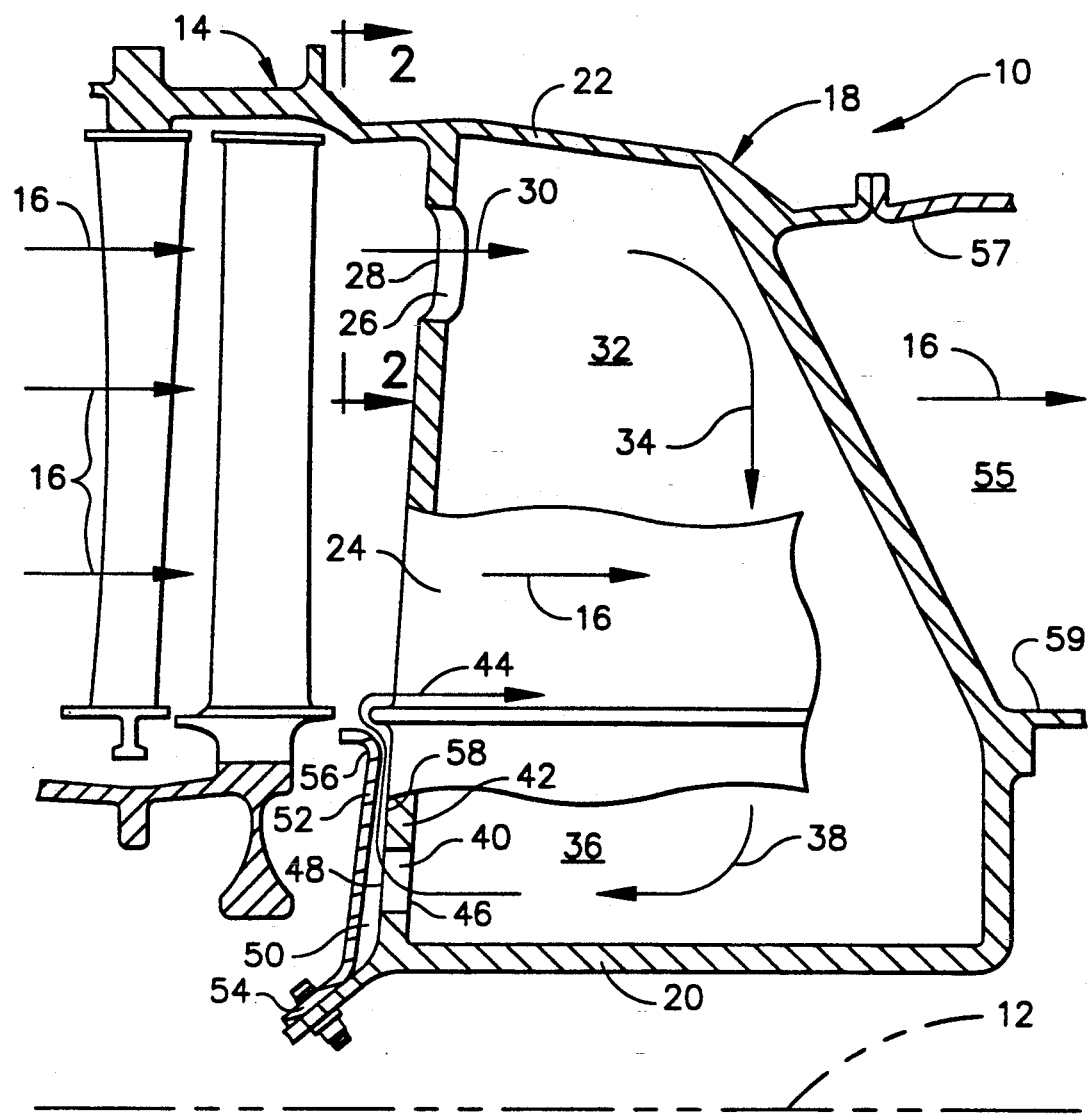
FIG. 1 is a fragmentary longitudinal cross-section depicting a prior art turbine rear frame assembly, wherein an assembly strut and inner hub are shown in partial cutaway view to illustrate the internal flow of gases.

Referring now to the drawings, wherein like reference numerals have been used for similar elements throughout, FIG. 1 illustrates a fragmentary longitudinal cross-section of an exemplary gas turbine engine 10. The engine 10 includes, in serial axial flow communication about an axially extending longitudinal centerline axis 12, conventional components including a fan, booster, high pressure compressor, combustor, high pressure turbine (all not shown), and low pressure turbine 14 (a portion of which is shown). The high pressure turbine is drivingly connected to the high pressure compressor with a first rotor shaft (not shown) and low pressure turbine 14 is drivingly connected to both the booster and the fan with a second rotor shaft (not shown).

During operation of engine 10 ambient air enters the engine inlet and a first portion, commonly denoted the primary or core gas stream, passes through the fan, booster and high pressure compressor, being pressurized by each component in succession. The primary gas stream then enters the combustor where the pressurized air is mixed with fuel to provide a high energy gas stream 16. The high energy gas stream 16 then enters in succession the high pressure turbine where it is expanded, with energy extracted to drive the high pressure compressor, and low pressure turbine 14 where it is further expanded, with energy being extracted to drive the fan and booster. A second portion of the ambient air entering the engine inlet, commonly denoted the secondary or bypass airflow, passes through the fan before exiting the engine 10 through an outer annular duct (not shown), which is formed between the nacelle assembly and core cowl (both not shown), wherein the secondary airflow provides a significant portion of the engine thrust.

Figure 2:
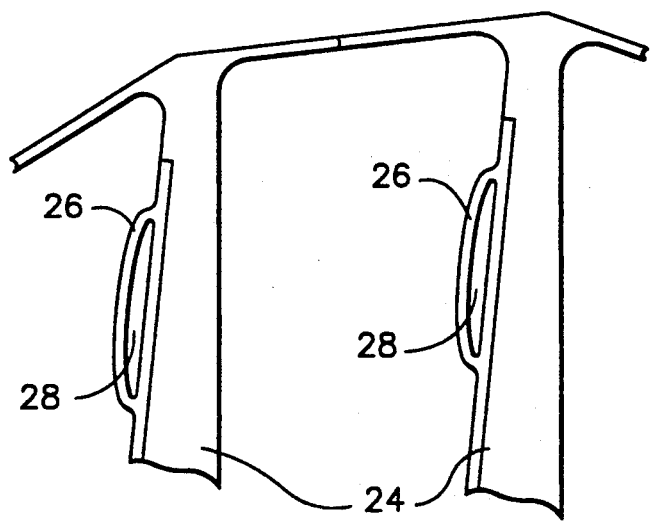
FIG. 2 is a partial circumferential view taken along line 2—2 in FIG. 1.

FIG. 1 illustrates a prior art turbine rear frame assembly 18. Turbine rear frame assembly 18 is positioned immediately downstream of low pressure turbine 14 and is fixedly connected, at a radially outer and axially forward end, to low pressure turbine 14. Turbine rear frame assembly 18 comprises a major load-carrying structural frame assembly of engine 10 and is connected, at a radially inner and axially forward end, to a bearing support structure (not shown). Turbine rear frame assembly 18 includes an annular inner hub 20, an annular outer casing 22, and a plurality of circumferentially spaced hollow struts 24 (one of which is shown in FIG. 1) which extend radially between and are fixedly connected to inner hub 20 and outer casing 22, wherein inner hub 20 and strut 24 are shown in cutaway view for subsequently described purposes. As best seen in FIG. 2, assembly 18 further includes a plurality of scoops 26, with one of the scoops 26 directly attached to each of the struts 24. Each scoop 26 has an inlet 28 facing the high energy gas stream flowpath 16 causing a flow of hot gases, depicted generally by arrow 30, to be directed into an interior 32 of each of the hollow struts 24. The flow of hot gases then travels radially inward through strut interior 32, as depicted by arrow 34, into an interior 36 of inner hub 20 as depicted by arrow 38. The flow of hot gases then exits inner hub 20 through a passage means 40 extending through a forward wall 42 of inner hub 20 and discharges into the high energy gas stream 16 at a location immediately upstream of struts 24, as depicted by arrow 44. Passage means 40 has an inlet 46 which is adjacent to the interior 36 of inner hub 20 and an outlet 48 which is adjacent to an annular plenum 50 formed between forward wall 42 of inner hub 20 and an annular shield 52 having an inner end 54 fixedly attached to inner hub 20 and an outer end 56 axially spaced from forward wall 42. Passage means 40 is in continuous flow communication with interior 36 and plenum 50 during the operation of engine 10. Annular shield 52 causes the flow of hot gases entering plenum 50 to scrub a forward surface 58 of forward wall 42 of inner hub 20 prior to the flow of hot gases re-entering the high energy gas stream flowpath 16, thereby enhancing the convective heat transfer between the flow of hot gases and forward wall 42. After passing through struts 24 of frame assembly 18, the high energy gas stream 16 exits engine 10 through an annular exhaust duct 55 which is formed between an annular exhaust nozzle 57 and an annular tail cone 59, wherein exhaust nozzle 57 and tail cone 59 are fixedly attached to radially outer and radially inner portions, respectively, of the aft end of frame assembly 18.

Although the utilization of scoops 26 in assembly 18 causes a reduction in the thermal mismatch between inner hub 20 and outer casing 22 as compared to prior turbine rear frame assemblies, due to the previously described flow of hot gases directed through the interior 32 of each strut 24 into hub interior 36 and exiting through passage means 40, assembly 18 exhibits several disadvantages as described in the background of the invention.

Figure 3:
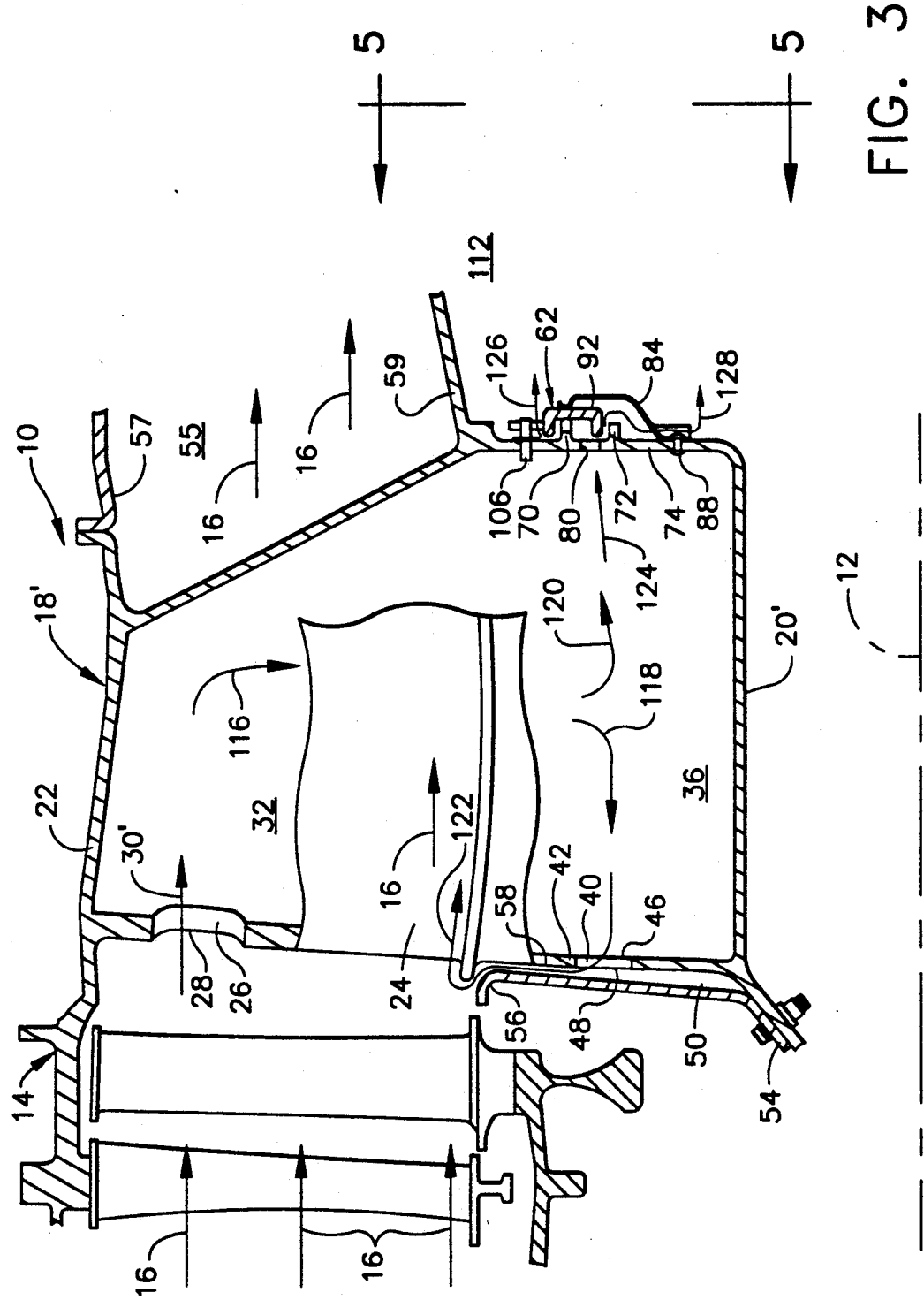
FIG. 3 is a fragmentary longitudinal cross-section similar to FIG. 1 illustrating the turbine rear frame assembly of the present invention including the thermally actuated valve of the present invention which is depicted in an open position.
Figure 4A:
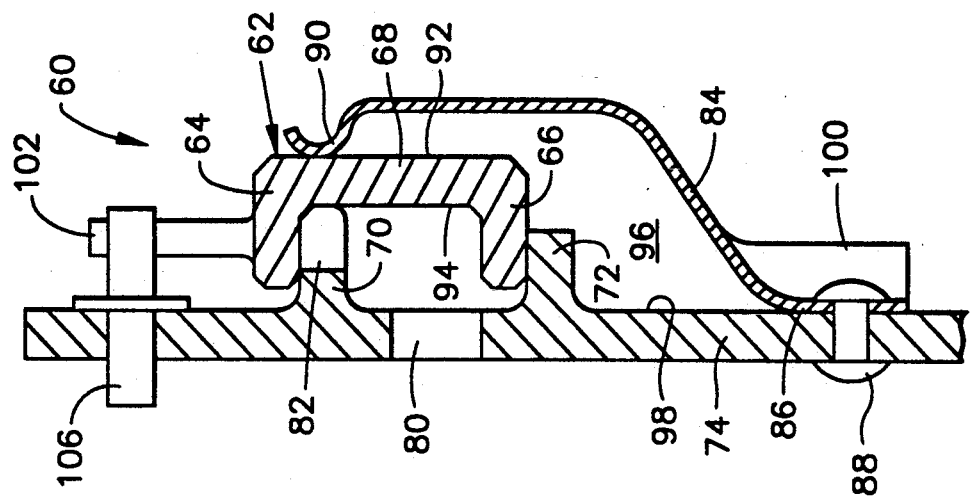
FIG. 4A is a view similar to FIG. 4 illustrating the thermally actuated valve of the present invention in a closed position.
Figure 4:
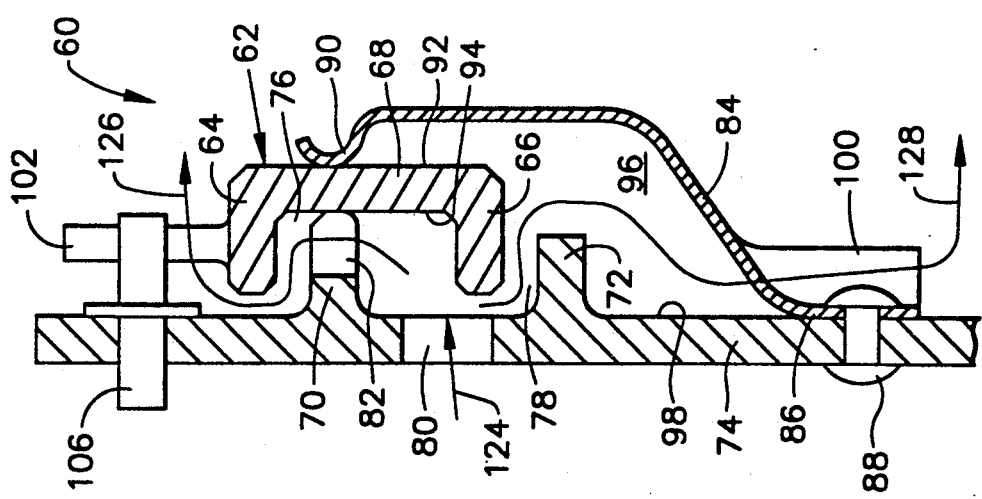
FIG. 4 is an enlarged view of a portion of the cross-section of FIG. 3 illustrating the thermally actuated valve of the present invention in an open position.
Figure 5:
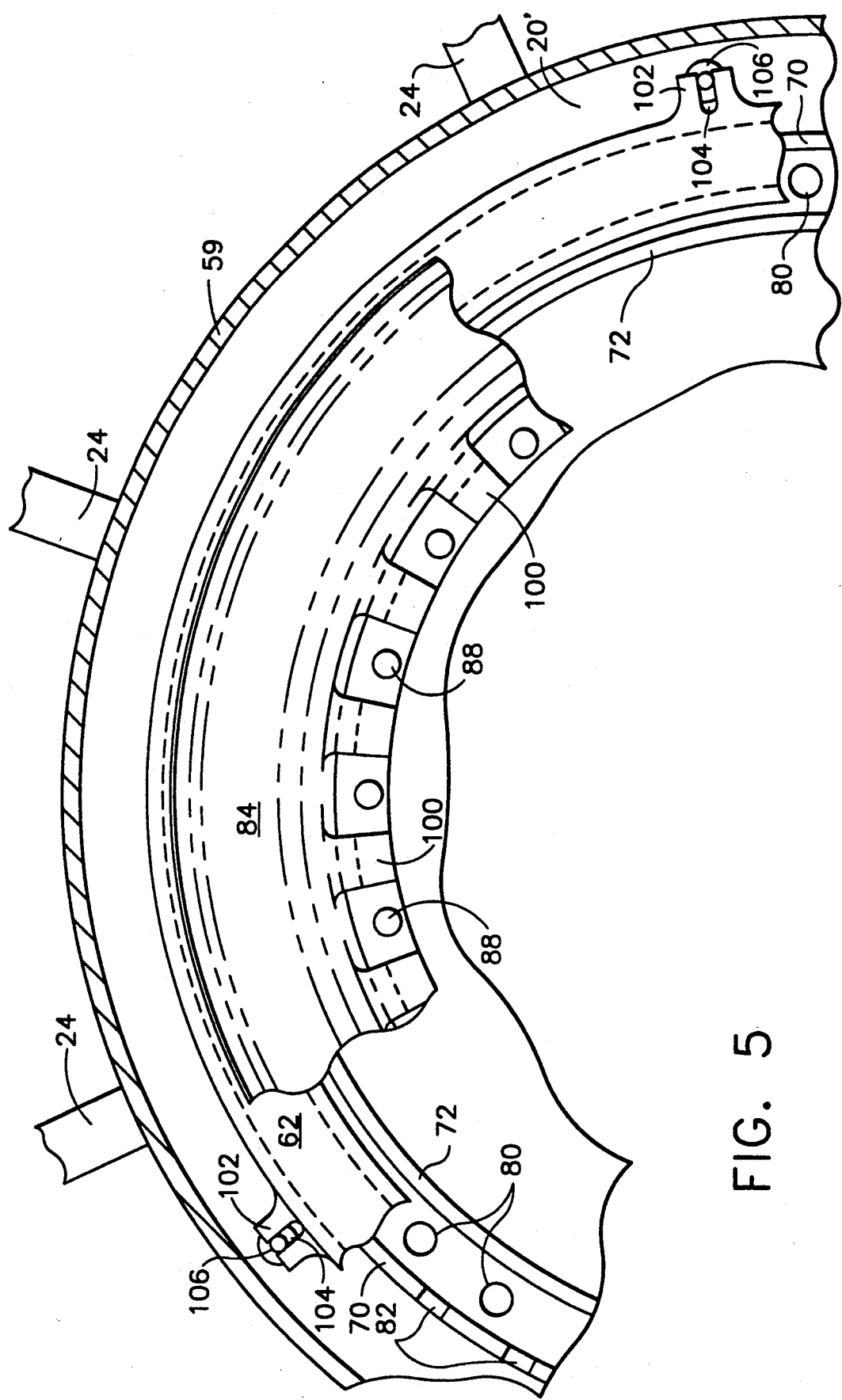
FIG. 5 is a partial circumferential view taken along line 5—5 in FIG. 3.

Referring now to FIGS. 3-5, the improved structural frame assembly 18' of the present invention is illustrated. In the preferred embodiment, structural frame assembly 18' comprises a turbine rear frame assembly and is fixedly connected, at a radially outer and axially forward end, to low pressure turbine 14 and is fixedly connected at a radially inner and axially forward end to a bearing support structure (not shown). As with prior art frame assembly 18, structural frame assembly 18' comprises an annular inner hub 20', which differs from annular inner hub 20 of assembly 18 as subsequently described, an annular outer casing 22, and a plurality of circumferentially spaced hollow struts 24 which extend radially between and are fixedly connected to inner hub 20' and outer casing 22, wherein outer casing 22 is concentric with inner hub 20' about longitudinal axis 12 of engine 10. Also similar to assembly 18, structural frame assembly 18' further includes: a plurality of scoops 26, with one of the scoops directly attached to each of the struts 24 and each scoop having an inlet 28 facing high energy gas stream 16; passage means 40 which extends through forward wall 42 of inner hub 20'; annular shield 52 which is fixedly attached at inner end 54 to inner hub 20' and which includes outer end 56 which is axially spaced from forward wall 42, thereby forming annular plenum 50 between forward wall 42 and shield 52; wherein scoops 26, passage means 40, plenum 50 and annular shield 52 function as described previously with respect to assembly 18. In the preferred embodiment, passage means 40 comprises a plurality of circumferentially spaced holes extending through forward wall 42 of inner hub 20'.

Unlike assembly 18, structural frame assembly 18' further comprises a thermally actuated valve means 60 which is best seen in FIGS. 4 and 4A, wherein FIG. 4 depicts valve means 60 in an open position and FIG. 4A depicts valve means 60 in a closed position. Valve means 60 comprises an annular valve member 62 having a C-shaped cross-section and made of a material having a relatively low thermal coefficient of expansion as compared to the relatively high thermal coefficient of expansion of the material comprising inner hub 20'. The inventor has determined that Titanium 6-4 and Inconel 718 are effective for use in the manufacture of valve member 62 and inner hub 20', respectively, wherein Titanium 6-4 and Inconel 718 have room temperature thermal coefficients of expansion of approximately $4.6 \times 10^{-6}$ in/in-°F. and $7.1 \times 10^{-6}$ in/in-°F., respectively. However, any combination of metallic alloys, which is otherwise acceptable for use in the manufacture of valve member 62 and inner hub 20', may be utilized provided that the material comprising valve member 62 has a thermal coefficient of expansion which is substantially lower than that of the material comprising inner hub 20'.

Valve member 62 includes a pair of annular and axially extending legs 64, 66 and an annular and radially extending leg 68 which is integrally attached to each of the axially extending legs 64 and 66. In the preferred embodiment, axially extending legs 64, 66 and radially extending leg 68 comprise a one-piece construction. Inner hub 20' includes a pair of annular, axially extending and radially spaced lips comprising outer lip 70 and inner lip 72, wherein lips 70 and 72 are integrally formed with aft wall 74 of inner hub 20'. When valve means 60 is in an open position, as illustrated in FIG. 4, leg 64 of valve member 62 and outer lip 70 form a first annular valve passage 76 therebetween and leg 66 of valve member 62 and inner lip 72 form a second annular valve 78 passage therebetween. When valve means 60 is in a closed position, as illustrated in FIG. 4A, legs 64 and 66 of valve member 62 engage outer lip 70 and inner lip 72, respectively, in axially overlapping engagements. Aft wall 74 of inner hub 20′ further includes a flow discharge means comprising a plurality of holes 80, as shown in FIGS. 4, 4A and 5. Each of the holes 80 has an inlet directly adjacent to the interior 36 of inner hub 20′ and an outlet facing valve member 62, wherein holes 80 are in open fluid flow communication with hub interior 36 and first and second valve passages 76, 78 when valve means 60 is in an open position, wherein flow communication between holes 80 and first valve passage 76 is accommodated by an intermediate passage means 82 formed in outer lip 70. In the preferred embodiment, intermediate passage means 82 comprises a plurality of circumferentially spaced apertures or slots extending through an aft end of outer lip 70.

An annular spring clip 84 is fixedly attached, at a radially inner end 86, to aft wall 74 of inner hub 20′ using a plurality of rivets 88 or other conventional fastening means such as bolts. A radially outer end 90 of spring clip 84 resiliently engages an aft surface 92 of radially extending leg 68 of valve member 62, wherein spring clip 84 urges a forward surface 94 of radially extending leg 68 against outer lip 70 of inner hub 20′. Spring clip 84 forms an annular plenum 96 with aft surface 92 of radially extending leg 68 of valve member 62 and an aft surface 98 of aft wall 74 of inner hub 20′, wherein spring clip 84 causes the flow of hot gases discharging from the second valve passage 78 into plenum 96 to scrub aft surface 98 before exiting plenum 96 through channel means 100 which is integrally formed with inner end 86 of spring clip 84, wherein channel means 100 comprises a plurality of circumferentially spaced convoluted channels in the preferred embodiment.

Structural frame assembly 18′ further includes a means for retaining valve member 62 in a concentric relationship with inner hub 20′ comprising a plurality of fork members 102 which are fixedly attached to axially extending leg 64 of valve member 62, wherein each fork member 102 includes a radially extending slot 104 for slideably engaging a pin 106 which is fixedly connected to aft wall 74 of inner hub 20′, as best seen in FIG. 5 wherein valve member 62 is partially cut away for clarity. Pins 106 and slots 104 are sized and configured such that relative radial movement between valve member 62 and inner hub 20′ is permitted while relative circumferential movement between valve member 62 and inner hub 20′ is prevented. Pins 106 may be attached to inner hub 20′ by conventional means such as brazing.

As with prior art frame assembly 18, structural frame assembly 18′ includes an annular exhaust nozzle 57 which is fixedly attached to a radially outer and axially aft end of structural frame assembly 18′, as best seen in FIG. 3. Annular tail cone 59 is fixedly attached to an axially aft portion of structural frame assembly 18′ at a location radially outward of valve means 60, such that tail cone 59 circumvents valve means 60. Annular tail cone 59 forms interior chamber 112 which is vented to ambient conditions. After passing through struts 24 of frame assembly 18′, the high energy gas stream 16 exits engine 10 through an annular exhaust duct 55 which is formed between exhaust nozzle 57 and tail cone 59, whereas the flow of hot gases exiting first valve passage 76 and spring clip channel means 100 discharge into chamber 112 prior to exiting engine 10, as subsequently discussed in greater detail.

Since the actuation of valve means 60 is dependent on a relatively small differential radial movement between valve member 62 and inner hub 20′, which is achieved due to the differences in the thermal coefficients of expansion of the materials comprising valve member 62 and inner hub 20′, the C-shaped cross-section of valve member 62 and the associated dual lips of inner hub 20′, corresponding to outer lip 70 and inner lip 72, play an important role in the operation of the present invention due to the maximization of the flow area of valve means 60. The total flow area of valve means 60 is equal to the sum of the flow areas of first and second annular valve passages 76 and 78, respectively, wherein annular valve passages 76 and 78 each have a radial height equivalent to the differential radial movement between valve member 62 and inner hub 20′. In the preferred embodiment a differential radial movement of 0.054 in. between valve member 62 and inner hub 20′, corresponding to the difference between the full open and full closed positions of valve means 60, provides a full open flow area of valve means 60 of 9.8 in.$^2$. By comparison, if valve member 62 comprised an L-shaped cross-section forming a single annular passage with a single lip formed on inner hub 20′, with the passage having a radial height equal to the differential movement between valve member 62 and inner hub 20′, the resultant flow area would be equal to one half of that achieved by valve means 60 of the present invention. As a matter of further comparison, the resultant flow area would be further reduced if valve member 62 comprised a solid ring operating to expose or close off an annular array of holes through aft wall 74, since these holes would necessarily be sized less than the aforementioned available differential movement of 0.054 in. between valve member 62 and inner hub 20′ due to manufacturing positional tolerances associated with the holes, and also due to the lost flow area associated with the circumferential spacing of the holes, as compared to a continuous annular flow passage. Furthermore, creation of such an array of holes, including a large number of small holes, would significantly increase manufacturing complexity and cost. The present invention maximizes the flow area of valve means 60 by utilizing circumferentially continuous annular valve passages 76 and 78 which each have a radial height equivalent to the aforementioned differential movement of 0.054 in. between valve member 62 and inner hub 20′ when valve means 60 is in a full open position. The features of the present invention allow valve means 60 to utilize the full range of the differential movement between valve member 62 and inner hub 20′ by taking advantage of the relatively low high-temperature creep strength of Titanium 6-4 which is used to manufacture valve member 62, as discussed in more detail subsequently. Holes 80 are sized such that the total flow area of the plurality of holes 80 is greater than the sum of the flow area of annular valve passages 76 and 78, in order to prevent holes 80 from being flow limiting restrictions. Similarly, intermediate flow passage means 82 in outer lip 70 is sized such that the total flow area of the plurality of apertures or slots which constitute intermediate flow passage means 82 is greater than the flow area of first valve passage 76.

In operation thermally actuated valve means 60 is modulated between an initial open position when engine 10 is in a cold, shutdown condition and a closed position during portions of the operating mission of engine 10, due to the differences in the thermal coefficients of expansion of the materials comprising valve member 62 and inner hub 20'. Using a computer model of structural frame assembly 18', the inventor has confirmed that valve means 60 functions as intended which results in valve means 60 remaining open during portions of the operating mission of engine 10 when the bulk temperature difference between outer casing 22 and inner hub 20' is relatively high, and that valve means 60 is closed during other portions of the operating mission when the temperature differential between outer casing 22 and inner hub 20' is within acceptable limits, thereby avoiding an undesirable performance penalty associated with the flow of hot gases through valve means 60 during these portions of the operating mission. In the preferred embodiment the operating mission of engine 10 corresponds to that of a high bypass ratio turbofan engine used for aircraft propulsion.

During the initial start of engine 10 and the initial portions of the subsequent acceleration from idle to take-off power conditions valve means 60 is in an open condition. Scoops 26 cause a flow of hot gases depicted generally by arrow 30', which is greater than the corresponding flow of gases 30 of assembly 18, to be directed into the interior 32 of each of the hollow struts 24. The flow of hot gases is then directed radially inward through interior 32 as depicted by arrow 116, which can be seen in FIG. 3 due to the partial cutaway view of strut 24. The flow of gases passing through the interior 32 of strut 24 then enters the interior 36 of inner hub 20' where a first portion flows toward passage means 40 formed in forward wall 42 and a second portion flows toward holes 80 in aft wall 74, as depicted generally by arrows 118 and 120, respectively. The flow of hot gases depicted by arrow 118 then flows through passage means 40 into plenum 50 and re-enters the high energy gas stream flowpath 16, as illustrated by arrow 122, wherein shield 52 causes the flow of gases within plenum 50 to scrub the forward surface 58 of forward wall 42 thereby enhancing the convective heat transfer between the flow of hot gases and forward wall 42 in the same manner as accomplished with assembly 18. The flow of hot gases depicted by arrow 120 exits inner hub 20' through holes 80 in aft wall 74 as depicted by arrow 124. As best seen in FIG. 4, the flow of hot gases then separates with a first portion flowing first through intermediate passage means 82 in outer lip 70 and then through first valve passage 76 and along a portion of aft wall 74 of inner hub 20', as depicted by arrow 126. A second portion, depicted by arrow 128, enters second valve passage 78 and discharges into plenum 96, wherein spring clip 84 causes the flow of hot gases entering plenum 96 to scrub aft surface 98 of aft wall 74 of inner hub 20' prior to exiting plenum 96 through channel means 100. As illustrated in FIG. 3, it can be seen that the flow of hot gases which exits first valve passage 76 and that which exits channel means 100, as depicted by arrows 126 and 128 respectively, each discharge into chamber 112, which is formed by tail cone 59 and which is vented to ambient conditions, prior to exiting engine 10. Since chamber 112 is vented to ambient conditions a lower sink pressure is provided, as compared to the sink pressure corresponding to the static pressure of gas stream 16 proximate the leading edges of struts 24, for the total pressure recovery of gas stream 16 achieved by scoops 26, which results in the hot gases scrubbing aft surface 98 of aft wall 74 with a substantial velocity and corresponding convective heat transfer coefficient, thereby maximizing the heat transfer benefit between the flow of hot gases and aft wall 74. The fact that the hot gases which exit first valve passage 76 and those which exit channel means 100 discharge into chamber 112, rather than re-enter gas stream 16 with a reduced performance penalty, underscores the importance of having valve means 60 closed during portions of the engine cycle when the bulk temperature differential between outer casing 22 and inner hub 20' is relatively low.

Returning now to a discussion of the operation of the present invention during the operating cycle of engine 10, the thermal response rate of inner hub 20' is relatively slow following the start of engine 10 due to the relatively large thermal mass of inner hub 20', whereas valve means 60, which is initially open in the prestart cold condition, remains open due to the previously described flow of hot gases past valve member 62 through first and second valve passages 76 and 78, respectively, and due to the relatively small thermal mass of valve member 62. The flow of hot gases through passages 76 and 78 coupled with the relatively small thermal mass of valve member 62 cause valve means 60 to remain open for a period of time, when the bulk temperature differential between outer casing 22 and inner hub 20' is relatively high, despite the relatively low thermal coefficient of expansion of the material comprising valve member 62 as compared to the relatively high thermal coefficient of expansion of the material comprising inner hub 20'. Following a rapid acceleration of engine 10 to take-off conditions, the thermal response of inner hub 20' begins to match that of valve member 62 such that by the time a climb power of engine 10 is subsequently selected the radial growth of inner hub 20' relative to valve member 62 is sufficient to close the radial gap between axially extending leg 64 of valve member 62 and outer lip 70 of inner hub 20' and the radial gap between axially extending leg 66 of valve member 62 and inner lip 72 of inner hub 20', thereby placing valve means 60 in a closed position. Valve means 60 remains closed during cruise operating conditions of engine 10 when the bulk temperature differential between outer casing 22 and inner hub 20' is relatively low. Valve means 60 re-opens during the descent portion of the operating mission of engine 10 which is desirable, notwithstanding the relatively small bulk temperature differential between outer casing 22 and inner hub 20' at this time, due to the potential need for a subsequent rapid re-acceleration to take-off power in order to accomplish an aircraft go-around, wherein the aforementioned acceleration would quickly cause the thermal gradient between outer casing 22 and inner hub 20' to increase.

Notwithstanding the fact that the operation of thermally actuated valve means 60 is dependent upon a relatively small differential radial movement between valve member 62 and inner hub 20', the elements comprising valve means 60 may be dimensioned with generous manufacturing tolerances by utilizing the relatively low high-temperature creep strength of Titanium 6-4 which is used to manufacture valve member 62. Valve member 62 is sized such that prior to the initial operation of engine 10, the closed position of valve means 60 would generate a 0.020 in. diametral interference between axially extending leg 64 of valve member 62 and outer lip 70 of inner hub 20' and between axially extending leg 66 of valve member 62 and inner lip 72 of inner hub 20'. Operation of engine 10 with the aforementioned interferences causes valve member 62 to creep, or permanently deform, such that after a few cycles of operation of engine 10, legs 64 and 68 of valve member 62 are line-to-line with the corresponding lips 70 and 72 of inner hub 20' with valve means 60 in the closed position and valve means 60 exhibits a maximum flow area when in the full open position.

In conclusion, the structural frame assembly 18' of the present invention has a reduced bulk temperature differential between outer casing 22 and inner hub 20' during operating conditions of engine 10 resulting in an improved buckling margin and cyclic life of outer casing 22, as compared to prior structural frame assemblies. An increased flow of hot gases is supplied to inner hub 20' to accomplish the aforementioned reduction in bulk temperature differential between outer casing 22 and inner hub 20', wherein the incremental flow of hot gases is modulated through thermally actuated valve means 60, which is mechanically simple and is relatively lightweight, in order to match the thermal requirements of inner hub 20' with the flow of hot gases and to minimize the performance penalty associated with the flow of hot gases, throughout the operating mission of engine 10. The combination of flow circuits which scrub the forward and aft walls, 42 and 74 respectively, of inner hub 20' result in a uniform temperature distribution within inner hub 20'.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, although the structural frame assembly of the present invention comprises a turbine rear frame assembly in the preferred embodiments, the present invention has potential application to other turbine hot-section frame assemblies. Additionally, the present invention can be advantageously utilized when the gas turbine engine incorporating the present invention is used for purposes other than aircraft propulsion. The protection desired to be secured by Letters Patent of the United States for this invention is defined by the subject matter of the following claims.

What is claimed is:

1. A structural frame assembly for use in a gas turbine engine, said assembly comprising:
    a) an annular inner hub made of a material having a relatively high coefficient of thermal expansion;
    b) an annular outer casing concentric with said inner hub about a longitudinal axis of said engine;
    c) a plurality of radially extending hollow struts extending between and fixedly connected to said inner hub and said outer casing; and
    d) means for reducing a bulk temperature differential between said inner hub and said outer casing and for providing a uniform temperature distribution of said inner hub;
    e) said means for reducing and providing comprising:
        i) scoop means for directing a flow of hot gases from a flowpath of said engine through an interior of each of said struts into an interior of said inner hub;
        ii) valve means for modulating a portion of the flow of hot gases entering said inner hub through a flow discharge means formed in an aft wall of said inner hub.

2. A structural frame assembly as recited in claim 1, wherein said valve means comprises an annular valve member having a C-shaped cross-section and made of a material having a relatively low thermal coefficient of expansion, wherein said valve means is thermally actuated.

3. A structural frame assembly as recited in claim 2, wherein:
    a) said valve member includes a pair of axially extending legs and a radially extending leg integrally attached to each of said axially extending legs; and
    b) said aft wall of said inner hub includes a pair of axially extending and radially spaced lips, wherein said pair of lips engages said pair of axially extending legs when said valve means is in a closed position and wherein said pair of lips form first and second annular valve passages with said pair of legs when said valve means is in an open position.

4. A structural frame assembly as recited in claim 3, wherein:
    a) said means for reducing and providing further comprises an annular spring clip having an inner end fixedly attached to said aft wall of said inner hub and an outer end resiliently engaging an aft surface of said radially extending leg of said valve member, wherein said spring clip urges a forward surface of said radially extending leg against a first one of said pair of lips; and
    b) said flow discharge means comprises a plurality of holes extending through said aft wall of said inner hub, each of said holes being in open fluid flow communication with said interior of said annular inner hub and with said first and second annular valve passages when said valve means is in the open position.

5. A structural frame assembly as recited in claim 4, wherein:
    a) said first one of said pair of lips includes an intermediate passage means for providing flow communication between said plurality of holes in said aft wall of said inner hub and said first annular valve passage when said valve means is in the open position;
    b) said spring clip forms an annular plenum with said valve member and said aft wall of said inner hub, wherein said spring clip causes the flow of hot gases discharging from said second annular valve passage into said annular plenum to scrub an aft surface of said aft wall of said inner hub before exiting said annular plenum through a channel means integrally formed with said inner end of said spring clip; and
    c) the flow of hot gases exiting each of said first annular valve passage and said channel means discharges to a chamber which is vented to ambient conditions.

6. A structural frame assembly as recited in claim 5, further comprising:
    a) means for retaining said valve member in a concentric relationship with said inner hub;
    b) wherein said means for retaining comprises a plurality of fork members fixedly attached to said valve member, wherein each of said fork members includes a radially extending slot for slideably engaging a pin fixedly connected to said aft wall of said inner hub.

7. A structural frame assembly as recited in claim 5, wherein said means for reducing and providing further comprises:
   a) an annular shield having an inner end fixedly attached to said inner hub and an outer end axially spaced from a forward wall of said inner hub such that said shield and said forward wall form a second annular plenum therebetween; and
   b) passage means extending through said forward wall of said inner hub, said passage means being in continuous flow communication with said interior of said inner hub and with said second annular plenum during operation of said engine;
   c) wherein said annular shield causes the flow of hot gases entering said second annular plenum to scrub a forward surface of said forward wall of said inner hub before discharging into said flowpath of said engine at a location immediately upstream of said hollow struts.

8. A structural frame assembly as recited in claim 7, wherein said scoop means comprises a plurality of scoops, each of said scoops being directly attached to one of said hollow struts and having an inlet facing said flowpath of said engine.

9. A thermally actuated valve, said valve comprising;
   a) an annular valve member having a pair of axial legs and a radial leg extending between and fixedly connected to each of said axial legs such that said pair of axial legs and said radial leg form a C-shaped cross-section of said valve member, and
   b) a pair of axial valve seats fixedly connected to a radial support wall, each of said valve seats being in axially overlapping engagement with corresponding ones of said axial legs when said valve is in a closed position;
   c) wherein said pair of axial legs and said pair of valve seats form a pair of annular valve passages when said valve is in an open position;
   d) wherein said pair of axial legs are made of a material having a relatively low thermal coefficient of expansion and said pair of valve seats are made of a material having a relatively high thermal coefficient of expansion.

* * * * *